United States Patent

[11] 3,603,292

| [72] | Inventor | Nigel Finch |
| | | Chedworth, Cheltenham, England |
| [21] | Appl. No. | 842,589 |
| [22] | Filed | July 17, 1969 |
| [45] | Patented | Sept. 7, 1971 |
| [73] | Assignee | Alfa-Laval Aktiebolag |
| | | Tumba, Sweden |

[54] AUTOMATED STALL AND MILKING EQUIPMENT
8 Claims, 9 Drawing Figs.

[52] U.S. Cl. ............................................... 119/14.1,
119/14.03, 119/14.08
[51] Int. Cl. .................................................. A01j 07/00
[50] Field of Search ........................................... 119/14.03,
14.08, 99, 27, 16, 14.13, 14.27, 14.43

[56] References Cited
UNITED STATES PATENTS

| 2,576,808 | 11/1951 | Perkins | 119/14.08 |
| 2,775,224 | 12/1956 | Rawson et al. | 119/14.13 |
| 2,886,000 | 5/1959 | Clegg | 119/14.27 |
| 2,902,975 | 9/1959 | Babson | 119/14.43 |
| 3,115,116 | 12/1963 | Schilling et al | 119/14.08 |
| 998,856 | 7/1911 | Mitchell | 119/14.08 |
| 2,496,307 | 2/1950 | Perkins | 119/14.08 |
| 2,689,546 | 9/1954 | Petri | 119/14.03 |
| 2,720,837 | 10/1955 | Reeve | 119/14.08 X |
| 3,115,116 | 12/1963 | Schilling et al. | 119/14.08 |
| 3,220,384 | 11/1965 | Trefz | 119/99 |
| 3,223,070 | 12/1965 | Gribble et al | 119/16 |
| 3,246,631 | 4/1966 | Holm | 119/14.03 |
| 3,448,725 | 6/1969 | Holm et al. | 119/27 |

Primary Examiner—Aldrich F. Medbery
Attorney—Young & Thompson

ABSTRACT: A milking parlor has a forked entry passage feeding two rows of stalls. The passage has an entry separated from each of two outlet legs, respectively leading to the two rows of stalls, by a vertically slidable guillotine-type gate. The exit from each of the outlet legs is controlled by a gate which is also of vertically slidable guillotine type. Each stall includes milk controlled teat cup and claw moving equipment having an articulated linkage arm which moves the claw relative to a support. Automation power means are provided for moving the arm between operative and inoperative milking positions.

PATENTED SEP 7 1971 3,603,292

INVENTOR
*NIGEL FINCH*

BY *Young & Thompson*

ATTORNEYS

AUTOMATED STALL AND MILKING EQUIPMENT

This invention relates to dairies of the so-called "parlour" type in which two rows of stalls are respectively disposed on opposite sides of an operator's pit. It is particularly concerned with dairies of this type in which a single operator can, without leaving the pit and during milking, control one by one the entry of cows to be milked via a forked entry passage as well as their individual exit from the stalls after milking.

According to the invention the milking parlor has a forked entry passage feeding the two rows of stalls, which passage has an entry separated from each of two outlet legs of the passage which respectively lead to the two rows of stalls by a vertically slidable or "guillotine-type" gate, the exit from each of the outlet legs being controlled by a gate which is also of vertically slidable "guillotine" type. The foregoing gates are hereinafter referred to as "guillotine gates," and they are preferably of tubular steel construction and slidable in vertical side guides of channel form with a central and vertically disposed pneumatic lifting cylinder.

The passage may have an entry leg separated from the two outlet legs by a single guillotine gate, in which case selective entry of a cow waiting in the entry leg to one or other of the outlet legs may be controlled by a swing gate which is side-hung at the junction of the two outlet legs so that it can be swung to one side or the other. Alternatively, entry to the outlet legs may be controlled by two separate guillotine gates. The provision of an entry passage ensures that only a single cow is waiting to enter either of the outlet legs and this prevents crowding of the guillotine gate or gates; however, it has been found that cows readily adapt themselves to the arrangement, and hence if more convenient the entry leg can be dispensed with and the passage then forked at the entry to provide the two outlet legs. In this case it is desirable that entry to the outlet legs should be controlled by two separate guillotine gates.

Each outlet leg in known manner preferably leads to a side passage which runs alongside the corresponding row of stalls to an exit passage at the end thereof, and each stall may be separated from the corresponding side passage by two side-hung gates which pivot about the center of the stall. One of these gates is opened to release an animal which has been milked and the other, i.e. the one adjacent the inlet passage, is subsequently opened to admit a fresh cow. A milking parlor in accordance with the invention is very conveniently fitted into a building which provides at least one loose box, a power house supplying essential services, and milk storage facilities with the parlor running along one side of the building.

The various guillotine and swinging gates which have been described are preferably operated mechanically employing a semiautomatic pneumatic control circuit under operator control by way of appropriate pushbuttons within the pit adjacent the corresponding stalls. It has been found that four or six stalls, arranged in two rows each of two or three stalls, is a convenient number for a single operator, but it will be appreciated that the present invention can be applied to a parlor having any desired number of stalls. The invention provides the advantage of individual treatment of each cow, with minimum operator fatigue, and a milking rate of 10 to 12 cows per hour per milking stall. Thus a parlor with four stalls can readily handle 40 to 48 cows per hour.

The semiautomatic control arrangements providing the automated sequence may include means which detect when an animal has ceased milking and automatically detach the milking cup "cluster" from the cow's udder, whereupon sequential gate operation commences which releases the milked animal and results in the vacated stall being occupied by a fresh animal. Thus milking becomes almost completely automatic, and washing may be carried out automatically within the forked entry passage and controlled by the automated sequence so that the only requirement on the operator is to wash down the animals and then fit the milking cups. However, it may be preferred that when the cluster is automatically detached a signal is given to the operator who then has to initiate the sequential gate operation manually.

In one preferred embodiment the milking cups are removed by mechanical arms the operation of which is initiated by means of a microswitch which is actuated in dependence on a spring balance arrangement with the milk from each stall being delivered into a small cup which is suspended on a balance spring. The cup is arranged in a collecting vessel from which the milk is fed to the milk collecting line and the cup has a small bottom aperture through which it drains at a rate very much less than the normal milking rate. Thus when the animal is milking the milk enters the cup and overflows therefrom, but on cessation of milking it drains through the bottom aperture and rises on the balance spring. At a predetermined level of the cup the microswitch is actuated.

The invention will now be further described with reference to the accompanying drawings which illustrate, by way of example, a dairy with a milking parlor in accordance with the invention. The drawings also illustrate semiautomatic pneumatic control gear for operation of the various guillotine and swing gates of the embodiment, and for automatic cup cluster removal at the cessation of milking. In the drawing.

The dairy combines a milking parlor $A$ and two loose boxes $B$ and $C$, and the complete building is rectangular in plan with the full length along one side occupied by the parlor $A$. The parlor has an entry 1 adjacent the corresponding corner at one end, and an exit 2 for animals after milking adjacent the corner at the other end.

The entry 1 provides access for an entry leg 3 of a forked inlet passage 4, which leg 3 can contain one cow and is fitted with inlet and outlet guillotine gates 5 and 6 respectively. When the outlet guillotine gate 6 is raised the animal waiting in the entry leg 3 can enter one or other of two outlet legs 7 and 8 according to the position of a swing selector or "shedder" gate 9 which is side-hung at 10 at the junction of the outlet legs 7 and 8. Thus when swung to one side it closes across one outlet leg (the leg 8 in the gate position of FIG. 1) and allows unimpeded entry to the other (the leg 7 in FIG. 1). The exit from each outlet leg 7 or 8 is controlled by a corresponding one of two further guillotine gates 12 and 13. The sidewalls of the passage 4 are provided by prefabricated tubular framework of rectangular section steel.

Figure 1:
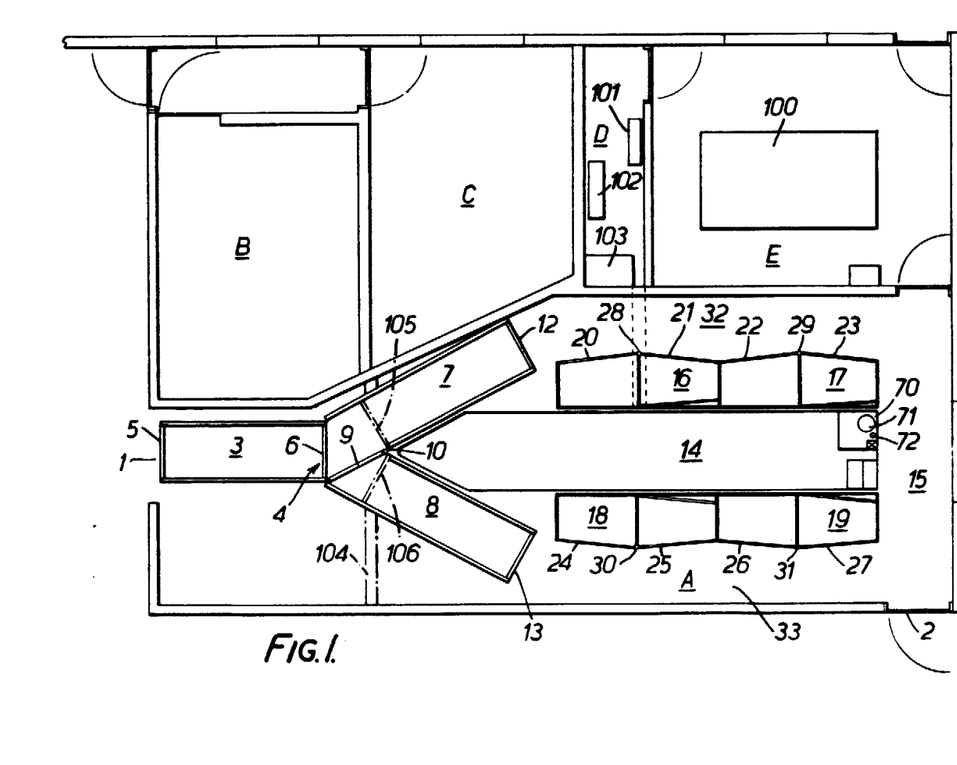
FIG. 1 is a plan view of the parlor.

An elongated operator's pit 14 runs lengthwise of the building from the junction of the outlet legs 7 and 8, so that the animals in the outlet legs are accessible to the operator for washing down, to an exit passage 15 at the exit end of the parlor. Two rows, each of two stalls 16,17 and 18,19 extend along the respective sides of the pit 14. The ends and inner side of each stall, i.e. the side adjacent the pit, are defined by permanent tubular steel framework, and the outer side of each stall is defined by two side-hung swing gates 20,21, 22,23, 24,25 or 26,27 which are hinged to a common hinge post 28, 29, 30 or 31 at the center of the corresponding stall. These gates are then closed (as shown in FIG. 1) inclined slightly from the hinge post towards the pit 14, and they allow communication between the corresponding stall and the adjacent one of two side passages 32 and 33 which lead respectively from the outlet legs 7 and 8 to the end exit passage 15.

Figure 2:
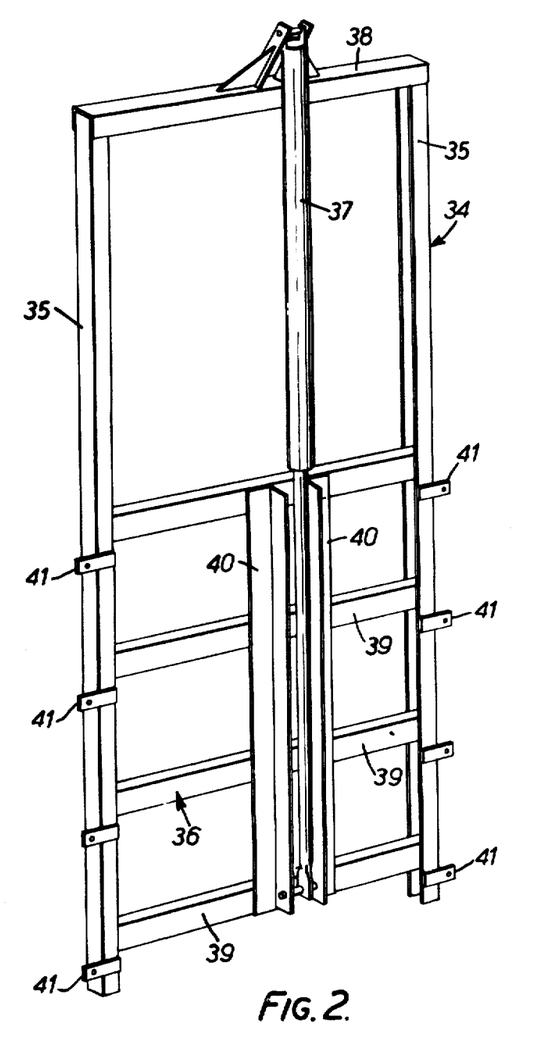
FIG. 2 is a perspective view of a guillotine gate of the parlor.

The guillotine gates 5, 6, 12 and 13 are of similar construction, and the gate 5 is illustrated in FIG. 2. A frame 34 comprises two steel channel members 35 forming side guides within which the gate proper 36 slides under the control of a vertical pneumatic lifting cylinder. The cylinder is disposed centrally and connected between a top crossmember 38 of the frame 34 and the bottom edge of the gate 36, and the latter consists of four spaced tubular steel crossmembers 39 which are of rectangular section and held together by a "backbone" of two parallel angle steel members 40 between which the ram of the cylinder 37 extends. The side members 35 have attachment brackets 41 for bolting the frame 34 to the adjacent steel framework of the passage 4.

The described construction enables four cows to be milked simultaneously by a single operator who does not need to leave the pit 14, sequential operation of the various gates being under the control of a semiautomatic pneumatic circuit employing pneumatic rams, such as the ram 37 already described, which operate to raise and lower or swing the gates as the case may be. The present invention is not limited to the actual form of the control circuit, but to allow a ready understanding of the operation of the parlor the general sequence of operation associated with one stall will now be described with specific reference to the typical control circuit illustrated in FIG. 3.

Figures 3, 3A:
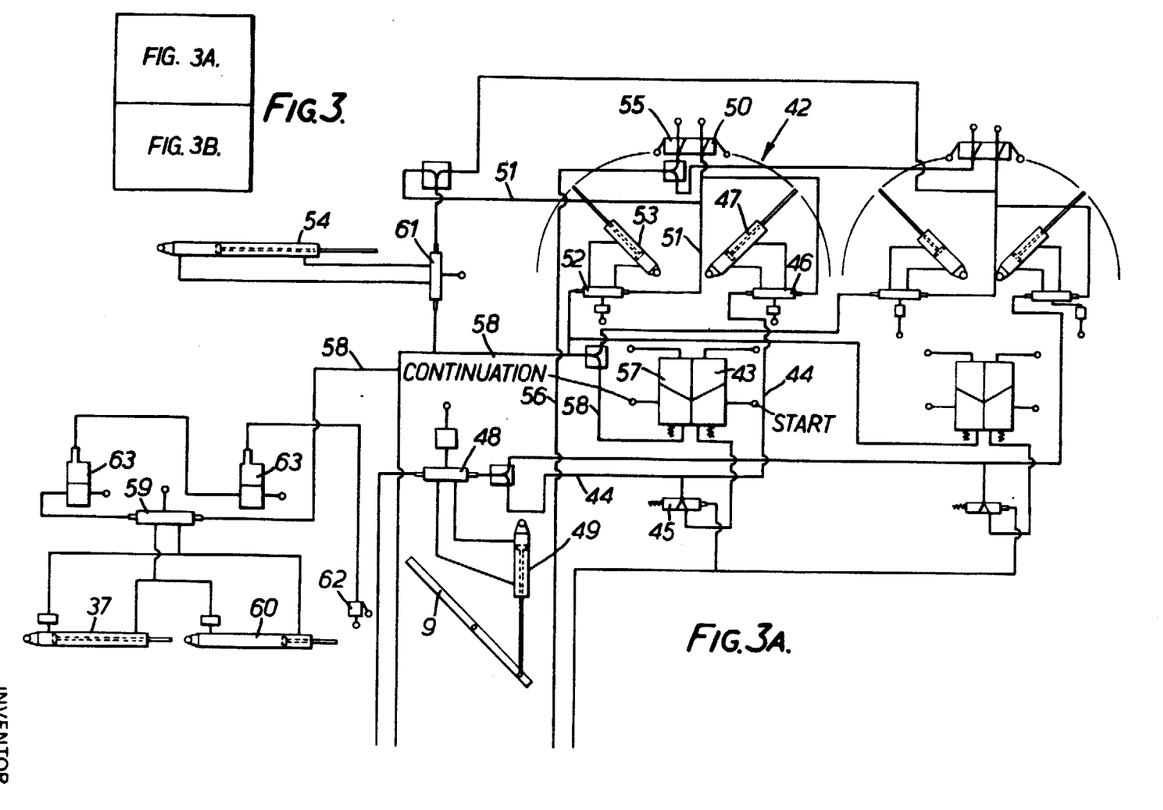
FIG. 3 comprising portions 3A and 3B is a pneumatic control circuit diagram.
Figure 3B:
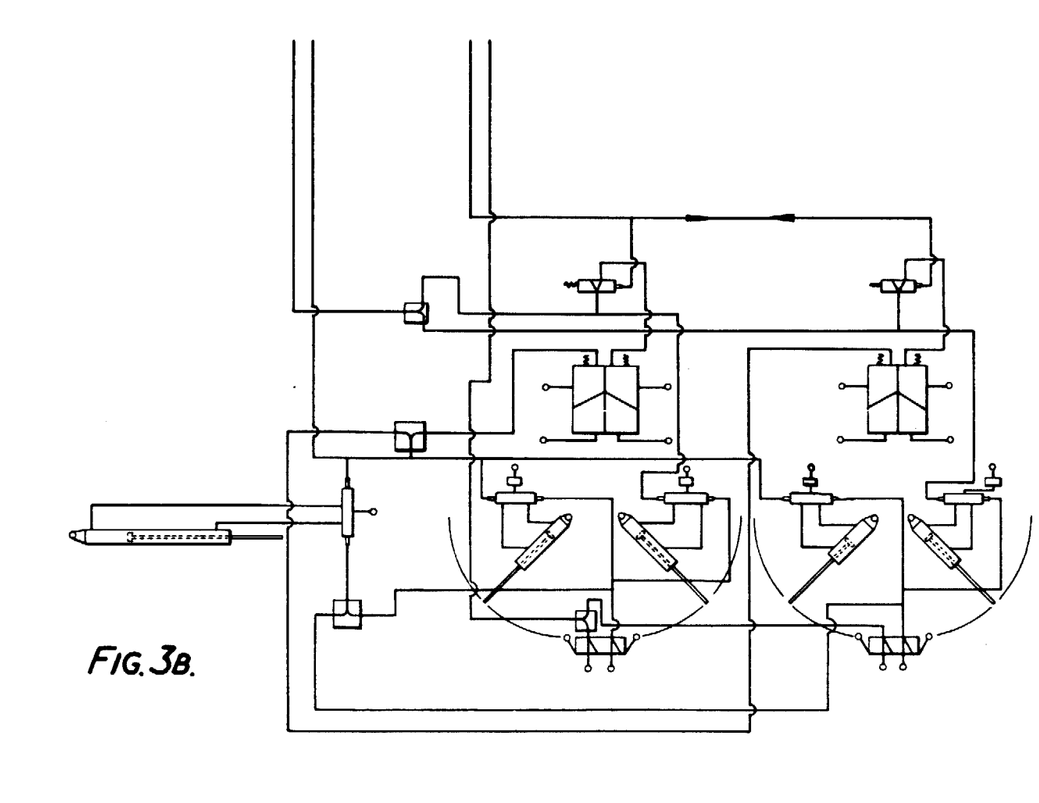

The control circuit of FIG. 3 comprises four generally similar sections respectively associated with the four stalls 16, 17, 18 and 19. One of the sections, which is denoted 42 in FIG. 3, is associated with the stall 16 and the general sequence of operation will now be considered at the stage when milking of a cow has finished in that stall. The operator presses a control "START" bottom positioned in the pit 14, whereupon the control circuit fulfills the following functions which result in a fresh cow entering the stall 16 ready for attachment of the milking cup cluster. Depression of the START button actuates a main control valve 43 which pressurizes a pilot line 44 through a spring-loaded pilot-operated interlock valve 45, assuming that the latter valve is in the normally open position. The result is the changeover of a pilot-operated valve 46 with consequent operation of a pneumatic cylinder 47 which opens the front stall gate 21, allowing the cow which has finished milking to leave the stall and pass to exit through the passages 32 and 15; at the same time the pilot line 44 pressure actuates a pilot-operated valve 48 which controls a pneumatic cylinder 49 to swing the selector gate 9 to the position of FIG. 1 which directs a fresh animal into the outlet leg 7. If the gate 9 is already in that position the pilot pressure has no effect on the valve 48.

As the front stall gate 21 reaches the fully open position it trips a limit switch 50 to pressurize a pilot line 51. This operates to change over the valve 46 to provide self-closure of the gate 21 and also changes over the corresponding valve 52 controlling a cylinder 53 connected to the rear stall gate 20 which accordingly opens ready to admit a fresh cow to the stall 16. The pressure in the pilot line 51 also changes over a control valve 61 which controls a cylinder 54 of the guillotine gate 12 which thus opens to allow the animal waiting in the outlet leg 7 to walk therefrom into the stall 16. When the gate 20 is fully open it trips a limit switch 55 which pressurizes an interlock pilot line 56. This holds closed the interlock valves associated with the stalls 18 and 19 on the opposite side of the pit and corresponding to the described valve 45. Thus, the START buttons associated with the stalls 18 and 19 are for the time being rendered inoperative.

After the outlet leg 7 has been vacated and the animal entered the empty stall 16 through the open rear gate 20, the operator presses a "CONTINUATION" button. This operates a control valve 57 to pressurize a pilot line 58 which changes over the valve 52 so that the rear stall gate 20 closes. The valve 61 is also changed over so that the guillotine gate 12 closes, and timed operation of the two guillotine gates 5 and 6 of the entry leg 3 commences. Pressurization of the pilot line 58 operates to change over a control valve 59 controlling the cylinder 37 and a cylinder 60 associated with the guillotine gate 6, and the result is that the gate 6 opens to allow the cow waiting in the entry leg 3 to walk through into the outlet leg 7 which has just been vacated, further progress being barred by the now closed gate 12. When the gate 6 is fully open it operates a limit switch 62 which acts through time delay devices 63 to change over the valve 59, so that the gate 6 closes after a time delay which is adequate for the entry leg 3 to be vacated. At the same time the cylinder 37 is actuated to open the gate 5 to allow the fresh cow waiting outside to enter the passage 4 so that the entry leg 3 is again occupied. As a result of closure of the gate 20 the pilot pressure is removed from the interlock valves associated with the START buttons of the stalls 18 and 19 so that they are again operative.

Thus the gates 5 and 6 open and close in a "seesaw" fashion with a timed delay of about 20 seconds between them, the result being that the cow occupying the entry leg 3 moves in to occupy the vacated outlet leg 7, and after the preset time delay a fresh cow at the head of the waiting queue outside enters the entry leg 3, through the again opened gate 5. Thus the two outlet legs 7 and 8 and the entry leg 3 are again filled with waiting cows, and it is found that the animals rapidly become trained and know what to do in response to opening and closing of the various gates. Their response times and speed of movement are sufficiently constant to allow the described time delay, and in other time delays which it may be found desirable to introduce for governing gate operation, to be computed and accurately preset.

Although the particular START button associated with the stall to be cleared must be pressed, any of the four CONTINUATION buttons can be pressed when the cleared stall has been occupied by a fresh animal. Pressing of the CONTINUATION button most convenient to the operator at the time not only performs the continuation sequence but as described cancels the interlock and all the START buttons are again operative. Appropriate operation of the control buttons by the operator when all the stalls are empty, before milking commences, initiates the sequence of gate operations during which cows occupy all four stalls 16, 17, 18 and 19 and the three legs 3, 7 and 8 of the entry passage 4.

As the pit 14 extends close to and right up to the junction of the outlet legs 7 and 8 the cows waiting therein are accessible for washing down by the operator and this will normally be found more convenient, although if desired it can be done in the stalls themselves. At the exit end of the pit 14 a deeper small pit 70 is provided in which is mounted a milk receiver jar 71 and a milk pump 72. A milk line (not shown) is installed around the pit 14 to collect milk from the separate milking units with individual pulsators which are respectively installed at the four stalls, and at the cessation of milking of an animal the cup cluster of the milking unit is automatically detached. To this end the milk from a stall is delivered to a corresponding graduated jar 74 from which the milk is supplied to the milk line, and it enters the jar through an inlet 75 which delivers into a cup 76 which has a small bottom drain aperture 77 and an open top. The cup 76 is supported on a vertical rod 78 which is slidably mounted in a bearing 79 at the top of the jar 74, above which it is connected to a microswitch 80 which is electrically connected to the control box illustrated in FIG. 4.

Figure 6:
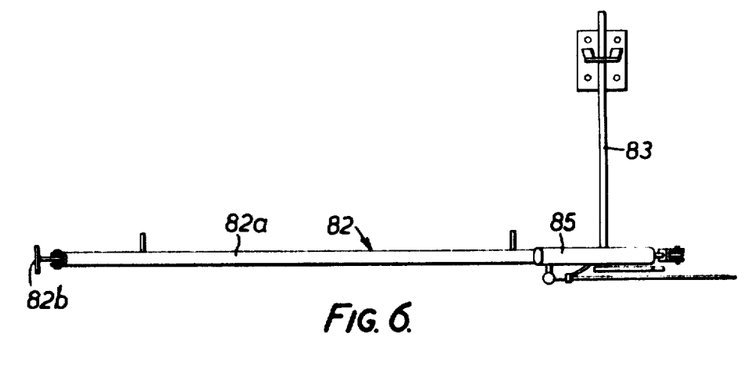
Figure 7:
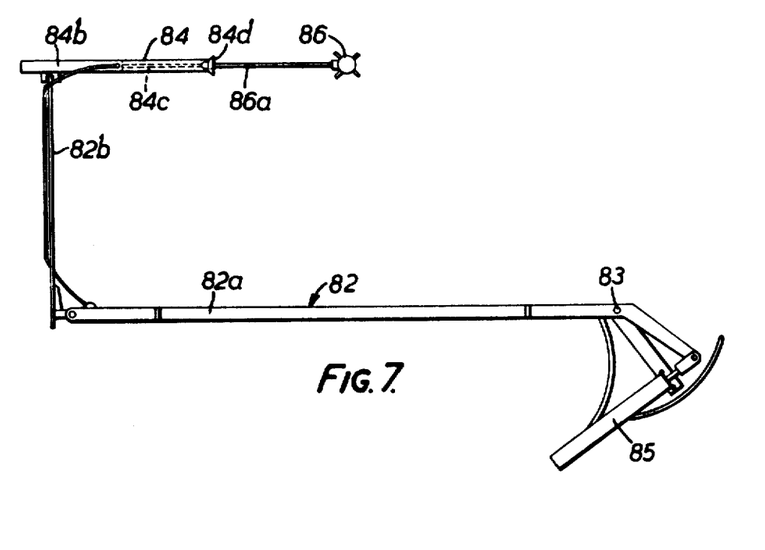

The invention is particularly characterized by the automatic withdrawal of the milking equipment in that the teat cups and claw, i.e. the cluster, of the milking unit are mounted on an articulated linkage 82 which lies in a horizontal plane and can move vertically as a whole along a vertical pivot 83. The linkage comprises an arm 82a which can be turned about the pivot 83 by a pneumatic cylinder 85, the total arc of movement being 85°a further arm 82b pivoted at the free end of the arm 82a and spring-urged in a direction to open up the linkage, and a tubular section 84 provides a second and smaller pneumatic cylinder 84b and this is connected through a chain 84c to the teat cup cluster 86 which has an arm 86a which sits in a flared mouth 84d of the tubular section 84 when the piston of the cylinder 84b is retracted. In this condition, which is illustrated in FIGS. 6 and 7, the section 84 and the cluster 86 are effectively held rigid under the tension of the chain 84c. In use the section 84 is aligned with the centerline of the cow and during milking the cylinder 84b is extended so that the chain 84c hangs loose and the cluster 86 is completely free to move in any direction. On cessation of milking the cylinders 84b and 85 are energized, the former operating first due partly to its smaller size and also to a restriction in circuit with the cylinder 85. Thus retraction of the cylinder 84b initially renders the section 84 and cluster 86 rigid, and extension of the cylinder 85 then swings the whole assembly away from the cow, detaching the teat cups as it does so.

In FIG. 7 the base of the cluster is illustrated at 86, the teat cups not being shown, and when the cluster is applied to the cow's udder a flow of milk commences into the cup 76. When this cup overflows as a consequence of letdown by the cow the weight moves the rod 78 against a balance spring 87 and this changes over the microswitch 80. At the start of milking the contacts of a latching relay 88 are open, and changing over of the microswitch 80 as milking commences closes the circuit to the relay 88 and also switches on a green indicator lamp 89, and no further change occurs so long as milking continues.

Figure 4:
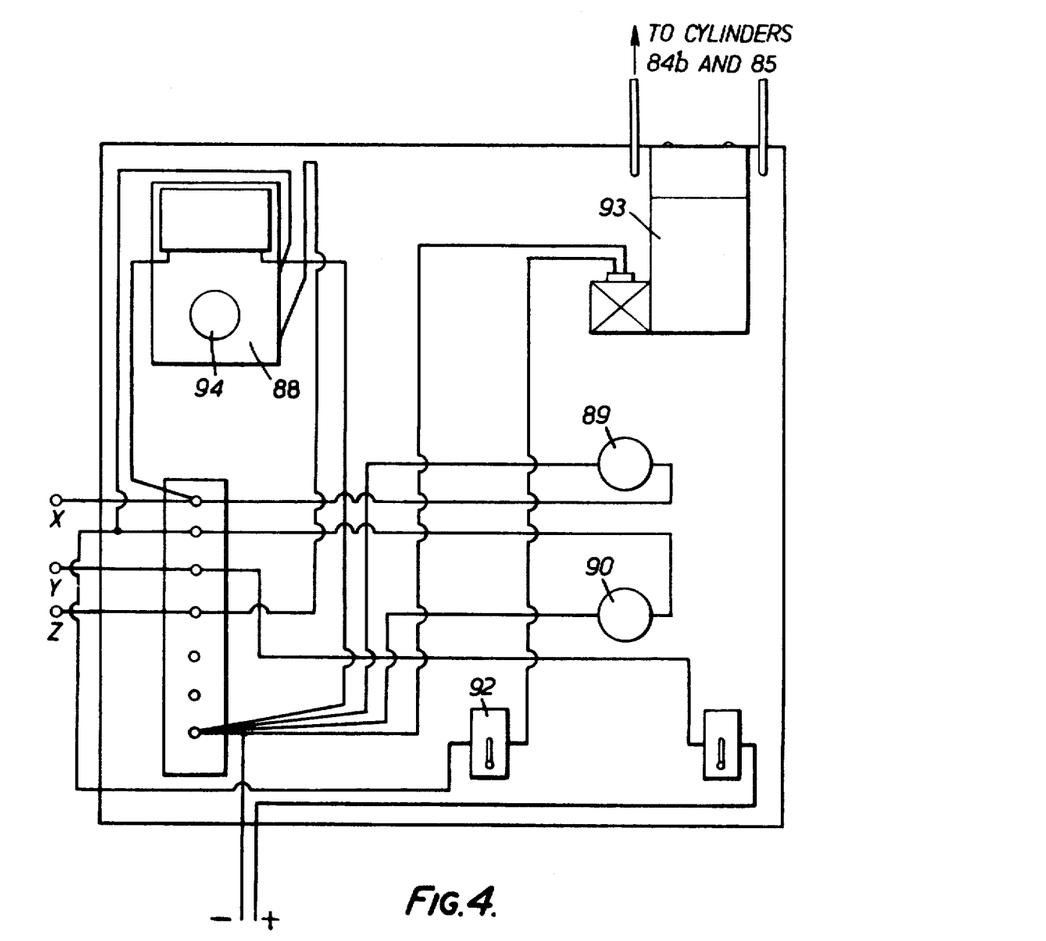
FIG. 4 illustrates diagrammatically a control box associated with cup cluster removal.
Figure 5:
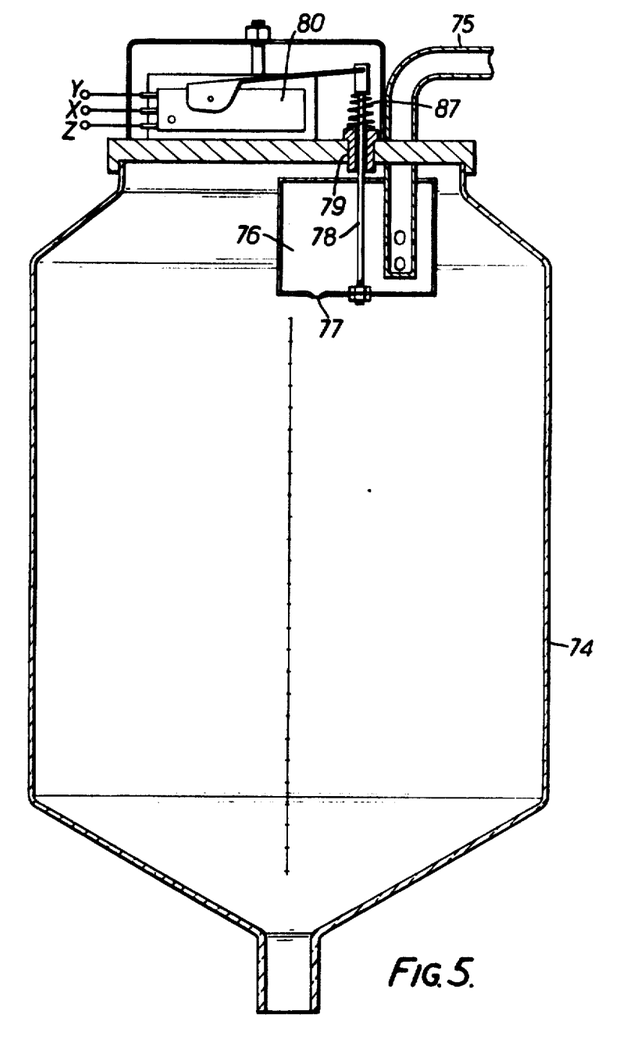
FIGS. 5 to 7 are detail views of the cluster removal mechanism and associated control means.

As the milk flow ceases the cup 76 drains slowly at a controlled rate through the drain aperture 77. As the cup rises it first breaks the contact to the relay 88 and the green light 89 is extinguished, and it subsequently closes the circuit of a red indicator lamp 90 and energizes an AUTO control switch 92 via the latching relay contacts as the latching relay 88 has not yet dropped out. If the AUTO switch is in the OFF position the red light will indicate to the operator that milking is complete, but if the switch is in the ON position a solenoid valve 93 opens and operates to pressurize the cylinders 84 and 85, the result of which is movement of the linkage 82 which removes the cup cluster.

The operator manually unlatches the relay 88 by means of a pushbutton 94 as he lets the cow out of the corresponding stall. This breaks the circuit of the red lamp 90 and also the solenoid 93, which closes with consequent exhaust of the cylinders 84 and 85 to bring the cup cluster back to a position for fitting to the next cow. Thus the operator has the option of either automatic removal or merely being given a red signal at the end of milking, and the unit cannot operate prematurely since closing of the latching relay 88 cannot occur until an adequate milk flow is present to fill the cup 76.

The other side of the building is occupied by the loose boxes B and C disposed side by side in the region of the entry passage 4, a narrow powerhouse D disposed alongside the loose box C, and a storage and washroom E with a bulk milk tank 100 and facilities for washing out the milk pipelines, etc. The milk tank 100 is supplied by the pump 72 and the powerhouse D has a vacuum pump 101 for the milking units, an air compressor 102 for the pneumatic controls and the usual water heating arrangements 103.

It is possible for the entry leg 3 to be dispensed with if so desired, and in this case the front parlor wall in the region of the entry can be moved back to the position illustrated in broken lines at 104 in FIG. 1. In this case not only is the entry leg 3 and the guillotine gate 5 dispensed with, but instead of the guillotine gate 6 and swing gate 9 the outlet legs 7 and 8 are now respectively controlled by separate guillotine gates shown in broken lines at 105 and 106. A suitable control circuit is used to operate the gates 105 and 106 in the appropriate sequence with the outlet gates 12 and 13.

I claim:

1. Machine milking equipment including a teat cup cluster carried by a support structure mounted for movement relative to a milking stall between a milking position and an inoperative position, said support structure comprising a generally horizontal support arm which is pivotable between the milking position and the inoperative position, means connecting said cluster to said arm for relative movement therebetween when in the milking position, means firmly holding said cluster to the arm during movement to the inoperative position, and power actuated means associated with said equipment for moving the support structure and cluster away from the milking position at the end of a milking operation.

2. Equipment according to claim 1, including a flexible coupling member connecting the cluster to the support arm and a tensioning device for tensioning the coupling member when required to hold the cluster firmly to the arm for movement therewith.

3. Equipment according to claim 2 wherein the said power-operated means and the tensioning means comprise separate pneumatic cylinders controlled by solenoid-operated valves.

4. Equipment according to claim 1 wherein the support structure comprises a generally horizontally disposed linkage supported for movement about a vertical axis at one side of the stall.

5. Equipment according to claim 4 wherein the said linkage is movable along the vertical axis to adjust the height of the support arm and cluster.

6. Equipment according to claim 1 including spring means lightly biassing the cluster in a direction generally longitudinal of the stall during milking.

7. Equipment according to claim 1 wherein movement of the support structure away from the milking position is initiated automatically in response to a reduction in the flow of milk through the cluster.

8. Equipment according to claim 7 wherein the flow of milk from the cluster is led into a vessel having a drainage aperture permitting loss of liquid from the vessel at a rate substantially less than the normal milking rate so that the milk level in the vessel tends to rise at the commencement of milking and to fall when the milking rate is substantially reduced and including means responsive to a reducing quantity of milk in the vessel for initiating movement of the support structure away from the milking position.